(12) United States Patent  (10) Patent No.: US 8,703,891 B2
Broad  (45) Date of Patent: Apr. 22, 2014

(54) CONTACT LENS

(71) Applicant: Sauflon CL Limited, Fareham (GB)

(72) Inventor: Robert Andrew Broad, Curdridge (GB)

(73) Assignee: Sauflon CL Limited (GB)

( * ) Notice: Subject to any disclaimer, the term of this patent is extended or adjusted under 35 U.S.C. 154(b) by 0 days.

(21) Appl. No.: 13/625,459

(22) Filed: Sep. 24, 2012

(65) Prior Publication Data

US 2013/0015595 A1    Jan. 17, 2013

Related U.S. Application Data

(63) Continuation of application No. 12/515,054, filed as application No. PCT/EP2007/062592 on Nov. 20, 2007, now abandoned.

(30) Foreign Application Priority Data

Nov. 22, 2006  (EP) ........................ 0623299

(51) Int. Cl.
C08F 30/08    (2006.01)
C08F 299/08   (2006.01)
C08F 26/10    (2006.01)
C08F 2/02     (2006.01)

(52) U.S. Cl.
USPC ............ 526/279; 526/264; 525/100; 525/106

(58) Field of Classification Search
USPC .......................... 526/264, 279; 525/100, 106
See application file for complete search history.

(56) References Cited

U.S. PATENT DOCUMENTS 4,139,513 A    2/1979  Tanaka et al.

(Continued)

FOREIGN PATENT DOCUMENTS

JP    08-319329 A    12/1996
WO    01/44861 A1    6/2001

(Continued)

*Primary Examiner* — Ling Choi
*Assistant Examiner* — David L Miller
(74) *Attorney, Agent, or Firm* — McDonnell Boehnen Hulbert & Berghoff LLP

(57) ABSTRACT

A contact lens formed of a composition comprising the reaction product of: A) at least 10 weight percent, based on the total composition weight excluding solvent, of at least one silicone-containing monomer of the formula I: where n is from 1 to 3, m is from 9 to 15, each a independently is $C_{1-4}$ alkyl, and each b independently is $C_{1-4}$ alkyl; B) at least 10 weight percent, based on the total composition weight excluding solvent, of 3-methacryloxypropyl tris(trimethylsiloxy)silane; C) N-vinyl pyrrolidone; and D) at least one other non-ionic hydrophilic monomer wherein the combined amount of A) and B) is at least 20 weight percent based on the total composition weight excluding solvent, and wherein the N-vinyl pyrrolidone (NVP) is present in such an amount that the reaction product comprises polyvinyl pyrrolidone (PVP) homopolymer.

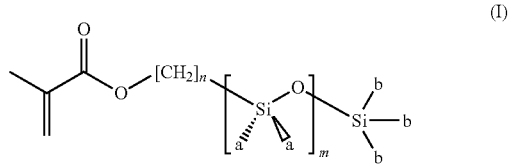

15 Claims, 1 Drawing Sheet

(56) References Cited

U.S. PATENT DOCUMENTS

| | | | |
|---|---|---|---|
| 4,139,692 | A | 2/1979 | Tanaka et al. |
| 4,216,303 | A | 8/1980 | Novicky |
| 6,367,929 | B1 | 4/2002 | Maiden et al. |
| 7,052,131 | B2 * | 5/2006 | McCabe et al. .......... 351/159.33 |
| 2002/0016383 | A1 | 2/2002 | Iwata et al. |
| 2005/0179862 | A1 * | 8/2005 | Steffen et al. ............. 351/160 H |
| 2006/0063852 | A1 | 3/2006 | Iwata et al. |
| 2006/0072069 | A1 | 4/2006 | Laredo et al. |
| 2006/0229423 | A1 * | 10/2006 | Parakka et al. ................. 528/37 |

FOREIGN PATENT DOCUMENTS

| | | |
|---|---|---|
| WO | 01/70837 A1 | 9/2001 |
| WO | WO 0170837 A1 * | 9/2001 |
| WO | 2006/026474 A2 | 3/2006 |

* cited by examiner

CONTACT LENS

CROSS-REFERENCE TO RELATED APPLICATIONS

This application is a continuation of U.S. patent Ser. No. 12/515,054, filed Aug. 25, 2009, which in turn is a Section 371 U.S. national phase of international application PCT/EP2007/008212, filed Sep. 20, 2007, which claims priority from EP 06020334.6, filed Sep. 27, 2006.

The present invention relates to hydrogel contact lenses made from silicone-containing monomers.

A hydrogel is a hydrated cross-linked polymeric system that contains water in an equilibrium state. Hydrogels typically are oxygen permeable and biocompatible, making them a preferred material for producing biomedical devices and in particular contact or intraocular lenses.

Conventional hydrogels are prepared from monomeric mixtures predominantly containing hydrophilic monomers, such as 2-hydroxyethyl methacrylate (HEMA) or N-vinyl pyrrolidone (NVP). U.S. Pat. Nos. 4,495,313; 4,889,664 and 5,039,459 disclose the formation of conventional hydrogels.

Conventional hydrogels have poor levels of oxygen permeability. Therefore, there has been a shift towards the introduction of silicone-containing monomers to increase the oxygen permeability. Silicone-containing polymers generally have higher oxygen permeabilities than conventional hydrogels.

However, the hydrophobic nature of silicone-containing polymers means that contact lenses made from them are difficult to wet. The suitability of a material for use in biomedical devices depends on the wettability of the material and its proclivity for adhesion or reaction with biological materials such as proteins and lipids.

One approach for dealing with the low wettability of silicone-containing contact lenses is to coat the hydrogels with a more hydrophilic coating. This adds an additional level of complexity to their manufacture. Additionally, coating material selection can be difficult as can the determination of proper coating thickness, coating uniformity and other factors that can affect physiological performance.

U.S. Pat. No. 5,219,965 proposes modifying the surface properties of polymeric objects such as contact lenses by the inclusion of macromers having a hydrophobic portion, a hydrophilic portion, a chain transfer agent, and an unsaturated end group in the monomer mix used to make the objects. The macromers can include poly-N-vinyl pyrrolidone having molecular weights of 500 to 10,000 with 1,000 to 5,000 being most preferred. The macromers are polymerized into the hydrogel and do improve wettability of the polymers. However, the improvement is generally not to such a degree that lenses can be made from the hydrogels without the need for a hydrophilic coating. In any event, enhancing the wettability of biomedical devices such as contact lenses without the need for lens coating would be considered a significant advance in the art.

U.S. Pat. Nos. 4,045,547 and 4,042,552 propose the polymerization of large amounts (14.25 to 35% wt) of polyvinyl pyrrolidone (PVP) into a poly(hydroxyethyl methacrylate) (HEMA) based contact lens formulation. The polymerizations are conducted without regard for the presence of water. No mention is made of the molecular weight of the PVP.

U.S. Pat. Nos. 4,833,196; 4,791,175; and 4,678,838 are directed to the incorporation of poly-N-vinyl lactams into polymers used to make contact lenses. Polyvinyl pyrrolidone (PVP) is the preferred polylactam. Low molecular weight (about 40,000 Daltons) PVP is covalently bonded with the monomers used to form the lens by first hydroperoxidizing the PVP by reaction with ozone and then polymerizing the PVP with the other monomers.

U.S. Pat. No. 5,198,477 employs low molecular weight (about 25,000 Daltons) PVP within an interpenetrating polymer network formed principally from macrocycles made from vinyl containing monomers. The PVP appears to be crosslinked into the interpenetrating network.

U.S. Pat. No. 6,367,929 discloses a wettable silicone hydrogel made by including a high molecular weight hydrophilic polymer into the silicone hydrogel monomer mix. The hydrophilic polymer is entrapped in the hydrogel with little or no covalent bonding between it and the hydrogel matrix. Typically the hydrophilic polymer is polyvinyl pyrrolidone.

We have now found that it is possible to produce a wettable silicone hydrogel contact lens without the need to introduce polyvinyl pyrrolidone as a polymer into the reaction mixture.

Accordingly, in a first aspect of the present invention, there is provided a contact lens formed of a composition comprising the reaction product of:

A) at least 10 weight percent, based on the total composition weight excluding solvent, of at least one silicone-containing monomer of the formula I:

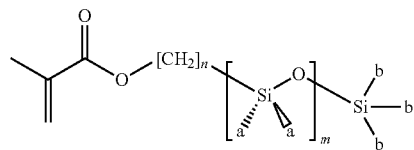

Formula I where n is from 1 to 3, m is from 9 to 15, each a independently is $C_{1-4}$ alkyl, and each b independently is $C_{1-4}$ alkyl;

B) at least 10 weight percent, based on the total composition weight excluding solvent, of 3-methacryloxypropyl tris(trimethylsiloxy)silane;

C) N-vinyl pyrrolidone;

D) at least one other non-ionic hydrophilic monomer; and wherein the combined amount of A) and B) is at least 20 weight percent based on the total composition weight excluding solvent, and wherein the N-vinyl pyrrolidone (NVP) is present in such an amount that the reaction product comprises polyvinyl pyrrolidone (PVP) homopolymer. Optionally, the reaction mixture additionally comprises up to 3 weight percent, based on the total composition weight excluding solvent, of acrylic or methacrylic acid.

The production of a PVP homopolymer can be tested by measurement of residual monomers present during curing. Sample compositions can be measured at different points of the cure, and the residual monomeric mixture can be tested to see which monomers remain.

One method by which the remaining monomers can be tested is described below. Other methods will be apparent to the skilled person. Sealed moulds filled with monomer are removed at various points during the cure process. The part-cured monomer/polymer mixture is removed, and a known amount of the monomer/polymer mixture placed into a known amount of solvent. The solvent/monomer mix is then analysed quantitatively to measure its components parts. This may be done, for example, using gas chromatography or high pressure liquid chromatography, although other methods may be employed. By removing moulds at different points through the cure process, a profile of the incorporation of the various monomers throughout the cure profile can be established. For contact lenses according to the present invention, the remaining monomers at some stage of the cure will be essentially only N-vinyl pyrrolidone, so that polymerisation of the remaining monomers will necessarily produce PVP homopolymer.

In a second aspect of the present invention, there is provided a contact lens formed of a composition comprising the reaction product of:
A) at least 10 weight percent, based on the total composition weight excluding solvent, of at least one silicone-containing monomer of Formula I above;
B) at least 10 weight percent, based on the total composition weight excluding solvent, of 3-methacryloxypropyl tris (trimethylsiloxy)silane;
C) from 20 to 60 weight percent, based on the total composition weight excluding solvent, N-vinyl pyrrolidone;
D) from 2 to 10 weight percent, based on the total composition weight excluding solvent, of at least one other non-ionic hydrophilic monomer;
E) from 0.2 to 2 weight percent, based on the total composition weight excluding solvent, of a free radical initiator; and
F) from 0.2 to 5 weight percent, based on the total composition weight excluding solvent, of a cross-linking agent,
wherein A) and B) are present in a combined amount of at least 20 weight percent based on the total composition weight excluding solvent. Optionally, the reaction mixture additionally comprises up to 3 weight percent, based on the total composition weight excluding solvent, of acrylic or methacrylic acid.

In a third aspect of the present invention, there is provided a method of making a contact lens comprising the steps of: mixing
A) at least 10 weight percent, based on the total composition weight excluding solvent, of at least one silicone-containing monomer of Formula I above;
B) at least 10 weight percent, based on the total composition weight excluding solvent, of 3-methacryloxypropyl tris (trimethylsiloxy)silane;
C) from 20 to 60 weight percent, based on the total composition weight excluding solvent, N-vinyl pyrrolidone;
D) from 2 to 10 weight percent, based on the total composition weight excluding solvent, of at least one other non-ionic hydrophilic monomer;
E) from 0.2 to 2 weight percent, based on the total composition weight excluding solvent, of a free radical initiator; and
F) from 0.2 to 5 weight percent, based on the total composition weight excluding solvent, of a cross-linking agent,
wherein A) and B) are present in a combined amount of at least 20 weight percent based on the total composition weight excluding solvent addition of a solvent in an amount of from 15 to 30 weight percent based on the weight of reactants, wherein the solvent comprises at least one primary alcohol;
adding the mixture into a contact lens mould; and
curing the reaction mixture to form a contact lens. Optionally, the reaction mixture additionally comprises up to 3 weight percent, based on the total composition weight excluding solvent, of acrylic or methacrylic acid.

The silicone containing monomers A) are generally not fully miscible with the other monomers. If components A) to E) are simply mixed in the absence of solvent, the mixture generally becomes cloudy when stirred, and separates into two distinct layers when left to stand for a few minutes. It is therefore preferred to utilise a suitable solvent, which will improve the mutual compatibility of the monomer components. The weight percentages of the reactants mentioned above are however calculated based on the total amount of reactants excluding any solvent.

Preferably, the solvent is utilised in an amount of from 10 to 30 parts by weight, based on 100 parts by weight of the total amount of reactants excluding solvent. It is preferred that the solvent comprises at least one primary alcohol, preferably ethanol, propanol or decanol. In a particularly preferred embodiment, the solvent comprises at least one primary alcohol (for example ethanol) and at least one additional solvent which is more hydrophobic than the primary alcohol, and which is present in an amount of from 20 to 50 weight percent of the solvent. The additional solvent may also be a primary alcohol. Particularly preferred additional solvents include propanol, hexanol, octanol, decanol and ethyl acetate. In a most favourable embodiment, the solvent comprises a mixture of ethanol and at least one of hexanol, octanol, decanol and ethyl acetate. Preferably, the solvent does not comprise any secondary or tertiary alcohols.

In a further aspect of the present invention, there is provided a method of making a contact lens comprising the reaction product of at least one silicone-containing monomer and at least one hydrophilic monomer, wherein the method comprises the step of incorporating in the reaction mixture from 10 to 30 weight percent, based on 100 weight percent of the reactants, of a mixed solvent, wherein the mixed solvent comprises ethanol and a co-solvent in an amount of at least 20 weight percent based on the total amount of solvent, wherein the co-solvent is at least one of propanol, hexanol, octanol, decanol and ethyl acetate.

This method is particularly useful for making the contact lens of the first aspect of the present invention. The solvent mixture is particularly good at preventing phase separation of the hydrophilic and hydrophobic monomers.

In situ production of PVP results in the ability to produce PVP-containing contact lenses without the need to add pre-polymerised PVP to the monomer mixture. If PVP is incorporated into the monomer mixture in polymerised form, it is necessary to employ secondary or tertiary alcohols, in order to ensure dissolution of the PVP polymer, as is discussed, for example, in U.S. Pat. No. 6,020,445. However, the use of secondary or tertiary alcohols in the polymerisation mixture is undesirable, because they are difficult to extract from the cured lens using water based extraction systems. In general, they require the use of complex solvent/water systems for their extraction, which leads to increased complexity and cost in manufacturing, as disclosed in WO01/27174. Therefore, by producing the PVP in situ, such complexity can be avoided.

Methacrylic acid (MAA) is not usually added to silicone-containing contact lenses. In conventional, non-silicone containing hydrogels, ionic materials such as methacrylic acid have been associated with increased bio-fouling, especially protein deposition. For this reason silicone hydrogel materials do not typically include ionic monomers.

It has now been found that, surprisingly, the addition of relatively small amounts of MAA reduces the haze of the produced contact lenses. Accordingly, when MAA is used in an amount of at least 1.5 weight percent, based on the total composition weight excluding solvent, haze is reduced in the hydrated contact lenses. The MAA is most preferably used in an amount of less than 2 weight percent, based on the total composition weight excluding solvent. However, it can be used in an amount of up to 4 weight percent, more preferably less than 3 weight percent.

Previously, it has been considered preferable to ensure that the amounts of monomers used are "normalised" i.e. the amount of monomers are chosen to ensure that the complete consumption of all of the monomers present occurs at approximately the same time so that homopolymers of one particular species are not produced. It was believed that if the amount of the monomers were not normalised, problems would arise with the resulting lens such as separation of hydrophobic and hydrophilic phases and haze or even opacity in either the dry or hydrated lens materials.

Because different monomers have different reactivity ratios, it is difficult to normalise the amount of monomers. Typically, monomers will polymerise at different rates, and therefore it is not straightforward to ensure that the different monomers react to form a single phase polymer. What the applicant has found is that normalization is not necessary. By the use of N-vinyl pyrrolidone with a careful choice of particular silicone monomers it is possible to produce a lens containing a silicon-containing copolymer and a PVP homopolymer. The resulting contact lens is wettable and does not suffer from phase separation or haze.

It will be apparent to those skilled in the art that in free radical initiated bulk polymerisations of this type that 100% conversion of monomer to polymer is difficult, if not impossible to achieve. For this reason, there are low levels of residual, unreacted monomers in the polymer at the completion of the reaction, which are typically removed by an aqueous or solvent extraction process to yield a contact lens suitable for in vivo use. It follows that some of these residual monomers will be incorporated into the polymer at the end of the reaction. For these reasons, it is understood that the PVP homopolymer produced at the end of the polymerisation will necessarily include very low levels of the other monomeric components of the formulation. Accurate quantification of the levels of these residual monomers incorporated into the lens polymer at the end of the reaction is very difficult due to the nature of the polymers produced. However it is understood that trace levels of the other components will be incorporated into the PVP homopolymer. Therefore, according to the present invention, PVP homopolymer is to be understood as covering polymers which consist essentially only of polymerized NVP with trace amounts of other monomers present.

It is preferred that the amount of N-vinyl pyrrolidone is present in an amount of from 20 to 60 weight percent. More preferably, N-vinyl pyrrolidone is present in an amount of at least 30 weight percent, and most preferably at least 40 weight percent. If the N-vinyl pyrrolidone is present in an amount greater than 60 weight percent, the resultant lens will not contain enough silicone-based material to have sufficient oxygen permeability.

As well as N-vinyl pyrrolidone, at least one other non-ionic hydrophilic monomer is used. A hydrophilic monomer is one which can combine with other monomers to form a polymer that has hydrophilic properties or can impart such properties to the final polymer. Molecules with hydrophilic properties have an affinity to water and are typically charged or have polar side groups to their structure that will attract water.

Examples of suitable hydrophilic monomers include hydroxyl substituted $C_{1-6}$ alkyl acrylates and methacrylates, for example 2-hydroxyethyl methacrylate (HEMA), (meth) acrylamide, ($C_{1-6}$ alkyl)-acrylamides and -methacrylamides, for example N,N-dimethylacrylamide (DMA), ethoxylated acrylates and methacrylates, hydroxyl substituted ($C_{1-6}$ alkyl) acrylamides and -methacrylamides, hydroxyl-substituted $C_{1-6}$ alkyl vinyl ethers, sodium vinylsulfonate, sodium styrenesulfonate, N-vinylpyrrole, 2-vinyloxazoline, 2-vinyl-4,4'-dialkyloxazolin-5-one, 2- and 4-vinylpyridine, amino($C_{1-6}$ alkyl)- (where the term "amino" also includes quaternary ammonium), mono($C_{1-6}$ alkylamino) ($C_{1-6}$ alkyl) and di($C_{1-6}$ alkylamino) ($C_{1-6}$ alkyl)acrylates and methacrylates and allyl alcohol.

It is preferred that the additional hydrophilic monomer is selected from hydroxyl-substituted $C_{1-6}$ alkyl acrylates and methacrylates, most preferably 2-hydroxyethyl methacrylate (HEMA).

In a particularly preferred embodiment, the additional hydrophilic monomers are present in an amount of from 2 to 10 weight percent. It is yet further preferred that the hydrophilic monomers are present in an amount of from 2 to 6 weight percent.

When HEMA is used, it is used in an amount of from 2 to 10 weight percent. Preferably, it is used in an amount of from 4 to 6 weight percent.

Monomer Component A is at least one silicone-containing monomer having the formula:

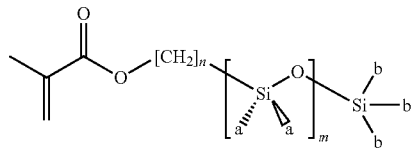

where n is from 1 to 3, m is from 9 to 15, each a independently is $C_{1-4}$ alkyl, and each b independently is $C_{1-4}$ alkyl.

It is particularly preferred that at least one of the silicone-containing monomers present is methacryloxypropyl(polydimethyl siloxane). Preferably the methacryloxypropyl(polydimethyl siloxane) has an average molecular weight of approximately 1000. A particularly preferred silicone monomer is methacryloxypropyl(polydimethyl siloxane) which is terminated with a trimethyl silyl group.

In a further aspect of the present invention, there is provided a contact lens formed of the reaction product of a composition comprising trimethylsilyl methacryloxypropyl (polydimethyl siloxane).

It is possible to include other silicone-containing monomers other than those of the Component A) or B). Examples of other silicone monomers may include, but are not limited to, 3-methacryloxy propylpentamethyldisiloxane, bis(methacryloxypropyl)tetramethyldisiloxane, N[tris(trimethylsiloxy)silylpropyl]methacrylamide (TSMAA), N[tris(trimethylsiloxy)silylpropyl]acrylamide, [tris(trimethylsiloxy) silylpropyl]methacryloxyethylcarbamate, N[tris (dimethylpropylsiloxy)silylpropyl]methacrylamide, N[tris (dimethylphenylsiloxy)silylpropyl]methacrylamide, N[tris (trimethylsiloxy)silylpropyl] methacryloxyglycerylcarbamate, N[tris (dimethylethylsiloxy)silylpropyl]methacrylamide, N[tris (trimethylsiloxy)silylpropyl]methacryloxyacetamide, and N[tris(trimethylsiloxy)silylpropyl]methacryloxymethyl dimethylacetamide. Additional silicone-containing monomers may be used up to a maximum amount of 10 weight percent, based on the total composition weight excluding solvent, preferably less than 5 weight percent, and more preferably no other silicone-containing monomers are included.

Preferably, an initiator is used, such as a free-radical initiator. Examples of suitable polymerisation initiators or catalysts which are well understood in the art include peroxide or azo containing compounds such as benzoyl peroxide, lauroyl peroxide, di-isopropyl-peroxy dicarbonate, azo bis(2,4-dimethyl valeronitrile), azo bis(isobutyronitrile), redox systems, for example ammonium persulphate, and photoinitiators for example benzoin methyl ether. Particularly preferred is 2,2'-azobisisobutyronitrile, (AZBN).

The composition also preferably comprises a cross-linker. Examples of suitable cross-linking agents include, $C_{2-6}$ alkylene glycol di(meth)acrylate, poly($C_{2-6}$ alkylene)glycol di(meth)acrylate, $C_{2-6}$ alkylene di(meth)acrylate, divinyl ether, divinyl sulfone, di- and trivinylbenzene, trimethylolpropane tri(meth)acrylate, pentaerythritol tetra(meth)acrylate, bisphenol A di(meth)acrylate, methylenebis(meth)acrylamide, triallyl phthalate and diallyl phthalate.

Standard UV absorbers and/or colorants may be added to the monomer mix using methods known to those skilled in the art.

Silicon-containing dimers may also be used as cross linking agents. Examples of suitable silicon-containing dimers include 1,3-Bis(methacrylamidopropyl)-1,1,3,3-tetrakis(trimethylsiloxy)disiloxane, 1,3-Bis(3-methacryloxypropyl)tetramethyldisiloxane, 1,3-Bis(N-methylmethacrylamidopropyl)-1,1,3,3-tetrakis(trimethylsiloxy)disiloxane, 1,3-Bis(methacrylamidopropyl)-1,1,3,3-tetrakis(trimethylsiloxy)disiloxane, Bis(methacryloxypropyl)polydimethylsiloxane, 1,3-Bis(acrylamidopropyl)-1,1,3,3-tetrakis(trimethylsiloxy)disiloxane, and 1,3-Bis(methacryloxyethylureidopropyl)-1,1,3,3-tetrakis(trimethylsiloxy)disiloxane.

The preferred cross linking agent is tetraethyleneglycol dimethacrylate.

The present invention is further illustrated by the following Examples and also with reference to the drawings in which.

EXAMPLES 1 TO 10

Figure 1:
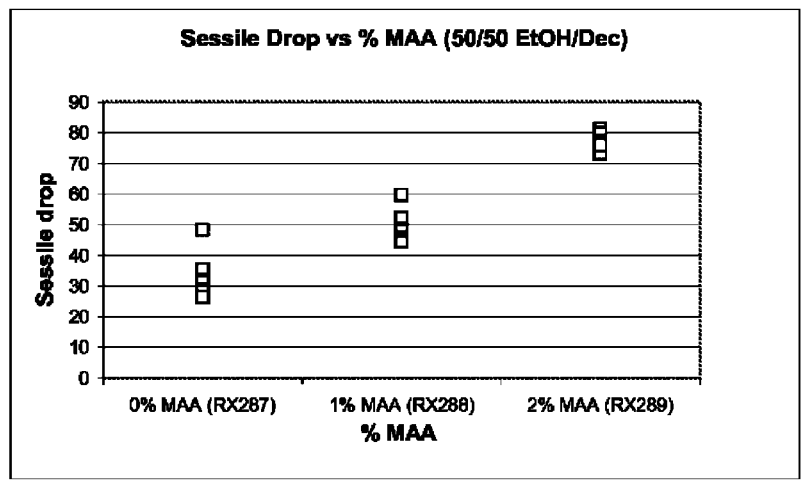
FIG. 1 shows the contact angle of lens formulations made using different amounts of methacrylic acid, as measured by sessile drop.

Contact lenses were made by reacting various monomer mixtures having the compositions shown in Table 1. For all contact lenses, a 50:50 mixture of ethanol and ethyl acetate was used as the solvent.

The reactants and solvent were mixed at room temperature to produce a curable mixture. The mixtures were placed in a contact lens mould and cured using a two stage cure in a nitrogen atmosphere. The cure involved a 1 hour purge in Nitrogen, followed by a first temperature ramp of 45° C./minute to 55° C., followed by curing at that temperature for 8.5 hours. Thereafter, the temperature was ramped to 124° C. at 45° C./minute, and then cured at 124° C. for 1 hour. The $O_2$ concentration in the oven is preferably less than 100 ppm, and more preferably less than 50 ppm.

TABLE 1

| | HEMA (%) | NVP (%) | Methacrylic acid (%) | Tris (%) | TEGDMA (%) | MAPDMS (%) | AZBN (%) | Total (exc. solvent) (%) | EtOH (%) | Ethyl Acetate (%) | Total (inc solvent) (%) |
|---|---|---|---|---|---|---|---|---|---|---|---|
| 1 | 4.67 | 52.55 | 0.00 | 20.06 | 2.40 | 19.94 | 0.38 | 100 | 10.00 | 10.00 | 120 |
| 2 | 4.67 | 52.53 | 0.00 | 20.05 | 2.02 | 19.93 | 0.79 | 100 | 10.00 | 10.00 | 120 |
| 3 | 4.56 | 51.25 | 2.00 | 19.56 | 2.40 | 19.44 | 0.79 | 100 | 10.00 | 10.00 | 120 |
| 4 | 4.59 | 51.68 | 2.00 | 19.72 | 2.02 | 19.61 | 0.38 | 100 | 10.00 | 10.00 | 120 |
| 5 | 4.57 | 51.46 | 2.00 | 19.64 | 2.02 | 19.52 | 0.79 | 100 | 10.00 | 10.00 | 120 |
| 6 | 4.58 | 51.47 | 2.00 | 19.65 | 2.40 | 19.53 | 0.38 | 100 | 10.00 | 10.00 | 120 |
| 7 | 4.65 | 52.33 | 0.00 | 19.97 | 2.40 | 19.86 | 0.79 | 100 | 10.00 | 10.00 | 120 |
| 8 | 4.69 | 52.75 | 0.00 | 20.14 | 2.02 | 20.02 | 0.38 | 100 | 10.00 | 10.00 | 120 |
| 9 | 4.57 | 51.46 | 2.00 | 19.64 | 2.02 | 19.52 | 0.79 | 100 | 10.00 | 10.00 | 120 |
| 10 | 4.57 | 51.46 | 2.00 | 19.64 | 2.02 | 19.52 | 0.79 | 100 | 10.00 | 10.00 | 120 |

Different lenses were made to vary the amount of methacrylic acid, cross-linker (TEGDMA) and initiator (AZBN). The lenses were typically tested for a number of different characteristics, including thickness, power, haze (subjective), surface quality, diameter, base curve (calculated from saggital height measurement), water content, and wettability by sessile drop and captive bubble contact angle measurement.

Prior to measurement lenses were hydrated in vials in bicarbonate buffered saline and equilibrated for at least 4 hours at 21° C.+/−1° prior to measurement. Where appropriate, equipment was calibrated prior to use.

Dry centre thickness is measured with a Mitutoyo Digimatic Indicator model 1D110-ME fitted to a model DGS-E stand.

Wet lens diameter and saggital height are measured on an Optimec type B contact lens analyser SAG model, and the base curve calculated.

Lens powers and image quality are measured using a Nikon PL2 Focimeter. Lens wet centre thickness is measured using a Rehder ET-3 electronic thickness gauge.

Surface quality was determined subjectively by inspecting the lens in a wet cell, with the lens image projected onto a screen with a magnification of ×17.5. Apart from the usual defects found in moulded contact lenses, surface marks of undetermined cause could be identified on lenses made under certain formulation and cure conditions. These marks were scored as a percentage of marks found, with zero being the preferred result.

Haze was assessed subjectively by viewing wet lenses in a wet cell on a documator. The documator is a device which illuminates the lenses from underneath, and allows the lenses to be observed at approximately 45° to the light source, to enable haze to be observed. Haze was assessed subjectively with a value of 5 indicating a completely opaque lens, and a level of 0 indicating no discernable haze. The values shown indicate the average of several assessments.

Water content measurements are made on either an Atago CL-1 contact lens refractometer or an Index Instruments Contact Lens Refractometer CLR12-70. The Atago refractometer is used by placing a sample lens directly onto the prism, gently clamping the sample with light finger pressure on the daylight plate, and focussing so that the scale can be clearly read. The upper area of the scale appears as a blue band, and the lower screen appears as a white band. Water content can be directly read from the scale at the point where the blue and white bands meet.

The Index refractometer is used by gently placing a lens on the sample holder and closing the lid. After a few seconds the reading stabilises and the result printed. The refractive index reading is converted to a water content using a previously validated equation.

Prior to measurement all lenses are equilibrated at 21°+/−1° C. in saline solution for a minimum of 2 hours, and gently blotted with lint free tissue to remove excess surface water immediately prior to measurement. Bulk water content may also be measured gravimetrically.

Sessile drop (water in air) and captive bubble (air in water) contact angles were measured using a Dataphysics OCA15 contact angle analyzer with contact lens adaptor. Lenses were equilibrated and measured in bicarbonate buffered saline.

Oxygen permeability can also be measured using a Rheder O2 Permeometer model 201T using the method described in the international standard ISO 9913-1.

The results of the tests for Examples 1 to 10 are shown in Table 2 below.

TABLE 2

|   | Diameter (mm) | Base-curve (mm) | % Water | Surface Marks % | Haze | Sessile Drop | Captive Bubble |
|---|---|---|---|---|---|---|---|
| 1 | 12.81 | 7.96 | 55.3 | 23 | 2.72 | 65.2 | 38.3 |
| 2 | 13.20 | 8.30 | 57.7 | 30 | 3.00 | 53.0 | 31.5 |
| 3 | 13.23 | 8.30 | 58.2 | 0 | 1.00 | 75.4 | 38.2 |
| 4 | 13.26 | 8.11 | 60.7 | 0 | 0.94 | 82.2 | 45.2 |
| 5 | 13.06 | 7.87 | 59.1 | 1 | 0.50 | 85.9 | 37.1 |
| 6 | 13.08 | 8.04 | 57.3 | 0 | 0.50 | 87.3 | 45.3 |
| 7 | 12.80 | 7.97 | 55.8 | 5 | 1.00 | 56.0 | 28.9 |
| 8 | 12.83 | 7.89 | 56.8 | 15 | 1.00 | 64.1 | 32.2 |
| 9 | 13.18 | 8.12 | 60.0 | 30 | 0.50 | 54.6 | 36.2 |
| 10 | 13.17 | 8.12 | 58.7 | 1 | 0.50 | 86.4 | 42.1 |

It can bee seen that the inclusion of MAA decreases the amount of haze in the lens. It can also be seen that the lenses according to the present invention have good contact angles, water content, clarity and surface quality.

EXAMPLES 11 TO 13

Examples 11 to 13 demonstrate the effect of methacrylic acid on compositions where ethanol and decanol as used as co-solvents in equal proportions.

The contact lenses were made in the same way as Examples 1 to 10 according to the compositions in Table 3.

TABLE 3

|   | HEMA (%) | NVP (%) | Methacrylic acid (%) | Tris (%) | TEGDMA (%) | MAPDMS (%) | AZBN (%) | Total (exc. solvent) (%) | EtOH (%) | Ethyl Acetate (%) | Total (inc solvent) (%) |
|---|---|---|---|---|---|---|---|---|---|---|---|
| 11 | 4.67 | 52.51 | 0.00 | 20.04 | 2.04 | 19.93 | 0.81 | 100.00 | 10.00 | 10.00 | 120.00 |
| 12 | 4.62 | 51.99 | 0.99 | 19.84 | 2.02 | 19.73 | 0.80 | 100.00 | 10.00 | 10.00 | 120.00 |
| 13 | 4.58 | 51.48 | 1.97 | 19.65 | 2.00 | 19.53 | 0.80 | 100.00 | 10.00 | 10.00 | 120.00 |

Figure 2:
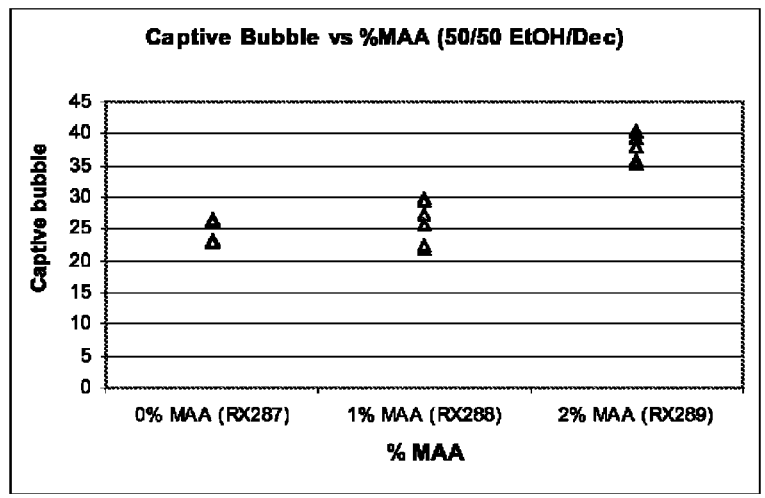
FIG. 2 shows the contact angle of lens formulations made using different amounts of methacrylic acid, as measured by captive bubble.

Several different contact lenses of each composition were tested to measure the contact angle as measured by sessile drop and captive bubble as described above. The results are shown in Table 4 below and in FIGS. 1 and 2.

TABLE 4

|  | Example 11 | | Example 12 | | Example 13 | |
|---|---|---|---|---|---|---|
|  | Sessile Drop | Captive Bubble | Sessile Drop | Captive Bubble | Sessile Drop | Captive Bubble |
|  | 48.3 | 23.3 | 59.8 | 27.2 | 73 | 40.5 |
|  | 28.6 | 26.4 | 49.6 | 29.6 | 75.9 | 35.2 |
|  | 26.4 | 22.9 | 44.6 | 29.5 | 80.1 | 37.8 |
|  | 32 | 26.5 | 49.3 | 25.7 | 80 | 35.6 |
|  | 35.2 | 26.3 | 48.1 | 21.7 | 81.2 | 39.2 |
|  |  |  | 52.3 |  |  |  |
| Mean | 34.1 | 25.1 | 50.6 | 26.7 | 78.0 | 37.7 |
| Standard Deviation | 8.61 | 1.81 | 5.15 | 3.26 | 3.47 | 2.28 |

It can be seen that an increase in the amount of methacrylic acid results in an increase in the contact angle as measured by both sessile drop and captive bubble. Increased contact angle is not favourable. However, at low levels of methacrylic acid, formulations have a tendency to produce lenses with high levels of haze. By carefully balancing the methacrylic acid content with the other formulation components, lenses with both low haze and good wettability may be obtained.

EXAMPLES 14 TO 37

Further contact lenses were made by reacting various monomer mixtures having the compositions shown in Table 5. The contact lenses were made using the same method as described for Examples 1 to 10 and the resultant contact lenses were tested in the same manner. In Examples 33 to 37, the wet lens diameter and base curve were measured on an Optimec type JCF.

TABLE 5

| Example | HEMA (%) | NVP (%) | MAA (%) | DMA (%) | TRIS (%) | TEGDMA (%) | IBoMA (%) | MAPDMS (%) | AZBN (%) | Ethanol (%) | n-Propanol (%) | Ethyl Acetate (%) | Total % (exc. EtOH) | Total % (inc. EtOH) |
|---|---|---|---|---|---|---|---|---|---|---|---|---|---|---|
| 14 | 4.84 | 54.72 | 1.98 | 0 | 17.84 | 1.98 | 0 | 17.84 | 0.79 | 15.03 | 0 | 0 | 100.00 | 115.03 |
| 15 | 4.59 | 51.87 | 2.00 | 0 | 19.77 | 1.22 | 0 | 19.77 | 0.79 | 15.03 | 0 | 0 | 100.00 | 115.03 |
| 16 | 4.72 | 53.40 | 1.50 | 0 | 18.96 | 1.65 | 0 | 18.96 | 0.81 | 17.50 | 0 | 0 | 100.00 | 117.50 |
| 17 | 4.93 | 55.71 | 1.00 | 0 | 18.17 | 1.22 | 0 | 18.17 | 0.81 | 15.03 | 0 | 0 | 100.00 | 115.03 |
| 18 | 4.63 | 52.40 | 1.00 | 0 | 19.97 | 1.22 | 0 | 19.97 | 0.80 | 20.03 | 0 | 0 | 100.00 | 120.03 |
| 19 | 4.89 | 55.28 | 1.00 | 0 | 18.03 | 1.98 | 0 | 18.03 | 0.80 | 20.03 | 0 | 0 | 100.00 | 120.03 |
| 20 | 4.55 | 51.46 | 2.00 | 0 | 19.62 | 1.98 | 0 | 19.62 | 0.78 | 20.03 | 0 | 0 | 100.00 | 120.03 |
| 21 | 4.72 | 53.42 | 1.50 | 0 | 18.97 | 1.65 | 0 | 18.97 | 0.77 | 17.50 | 0 | 0 | 100.00 | 117.50 |
| 22 | 4.60 | 52.00 | 0.99 | 0 | 19.82 | 1.97 | 0 | 19.82 | 0.79 | 15.03 | 0 | 0 | 100.00 | 115.03 |
| 23 | 4.72 | 53.42 | 1.50 | 0 | 18.97 | 1.65 | 0 | 18.97 | 0.77 | 17.50 | 0 | 0 | 100.00 | 117.50 |
| 24 | 4.87 | 55.14 | 2.00 | 0 | 17.98 | 1.22 | 0 | 17.98 | 0.80 | 20.03 | 0 | 0 | 100.00 | 120.03 |
| 25 | 4.84 | 54.72 | 1.98 | 0 | 17.84 | 1.98 | 0 | 17.84 | 0.79 | 25.02 | 0 | 0 | 100.00 | 125.02 |
| 26 | 4.59 | 51.87 | 2.00 | 0 | 19.77 | 1.22 | 0 | 19.77 | 0.79 | 25.02 | 0 | 0 | 100.00 | 125.02 |
| 27 | 4.72 | 53.40 | 1.50 | 0 | 18.96 | 1.65 | 0 | 18.96 | 0.81 | 22.51 | 0 | 0 | 100.00 | 122.51 |
| 28 | 4.93 | 55.71 | 1.00 | 0 | 18.17 | 1.22 | 0 | 18.17 | 0.81 | 22.51 | 0 | 0 | 100.00 | 122.51 |
| 29 | 4.93 | 55.71 | 1.00 | 0 | 18.17 | 1.22 | 0 | 18.17 | 0.81 | 22.51 | 0 | 0 | 100.00 | 122.51 |
| 30 | 4.60 | 52.00 | 0.99 | 0 | 19.82 | 1.97 | 0 | 19.82 | 0.79 | 25.02 | 0 | 0 | 100.00 | 125.02 |
| 31 | 4.93 | 55.71 | 1.00 | 0 | 18.17 | 1.22 | 0 | 18.17 | 0.81 | 22.51 | 0 | 0 | 100.00 | 122.51 |
| 32 (C) | 10.61 | 30.94 | 0 | 0 | 43.76 | 0.10 | 0 | 14.59 | 0.05 | 21.07 | 0 | 0 | 100.05 | 121.12 |
| 33 (C) | 4.89 | 24.64 | 0 | 24.64 | 32.00 | 1.00 | 0 | 12.00 | 0.83 | 0 | 10.00 | 0 | 100.00 | 110.00 |
| 34 (C) | 4.89 | 24.64 | 0 | 24.64 | 32.00 | 1.00 | 0 | 12.00 | 0.83 | 10.00 | 0 | 0 | 100.00 | 110.00 |
| 35 | 6.55 | 38.97 | 0 | 12.99 | 19.91 | 1.00 | 0 | 19.80 | 0.78 | 0 | 0 | 11.20 | 100.00 | 111.20 |
| 36 | 6.55 | 38.97 | 0 | 12.99 | 19.91 | 1.00 | 0 | 19.80 | 0.78 | 0 | 11.20 | 0 | 100.00 | 111.20 |
| 37 | 6.36 | 44.14 | 0 | 6.31 | 19.33 | 0.97 | 2.91 | 19.22 | 0.76 | 0 | 16.02 | 0 | 100.00 | 116.02 |

(C) is a comparative example. Example 37 includes 2.91% isobornyl methacrylate (IBoMA).

The results are shown in Table 6.

TABLE 6

| Example | Haze | Surface Marks % | Diameter | Base Curve | % Water | Sessile drop | Captive bubble |
|---|---|---|---|---|---|---|---|
| 14 | 1 | 1.7 | 13.75 | 8.65 | 66.2 | 74.5 | 48.4 |
| 15 | 0.83 | 0 | 13.77 | 8.71 | 65.6 | 90.6 | 59.7 |
| 16 | 1 | 2 | 13.98 | 8.82 | 65.2 | — | — |
| 17 | 1.4 | 6.6 | 13.91 | 8.75 | 67.7 | 54.4 | 38.1 |
| 18 | 2.8 | 2 | 13.9 | 8.68 | 66.6 | 42.5 | 37.9 |
| 19 | 2 | 35 | 13.88 | 8.89 | 66.3 | 35.3 | 34.6 |
| 20 | 1.9 | 11 | 13.46 | 8.59 | 66.6 | 55.0 | 40.0 |
| 21 | 1 | 10 | 13.75 | 8.79 | 65.1 | 44.0 | 43.4 |
| 22 | 2 | 15 | 13.53 | 8.63 | 62.5 | 90.2 | 49 |
| 23 | 2 | 4 | 13.81 | 8.81 | 66.6 | 46.2 | 34.3 |
| 24 | 3 | 20 | 13.83 | 8.69 | 65.4 | 42.8 | 32.9 |
| 25 | 1 | 1.7 | 13.75 | 8.65 | 66.2 | 74.5 | 48.4 |
| 26 | 0.83 | 0 | 13.77 | 8.71 | 65.6 | 90.6 | 59.7 |
| 27 | 1 | 2 | 13.98 | 8.82 | 65.2 | — | — |
| 28 | 1.4 | 6.6 | 13.91 | 8.75 | 67.7 | 54.4 | 38.1 |
| 29 | 2.8 | 20 | 13.90 | 8.68 | 66.6 | 42.5 | 37.9 |
| 30 | 2 | 35 | 13.88 | 8.89 | 66.3 | 35.3 | 34.6 |
| 31 | 1.9 | 11 | 13.46 | 8.59 | 66.6 | 55.0 | 40.0 |
| 32 (C) | 5 | — | 12.24 | 7.28 | 47.8 | 99.4 | 65.4 |
| 33 (C) | 1 | — | 14.33* | 8.88* | 64.8 | 103.2 | 32.7 |
| 34 (C) | 1 | — | 14.50* | 8.85* | 64.8 | 108.5 | 26.8 |
| 35 | 1 | — | 13.70* | 8.65* | 62.7 | 93.6 | 36.0 |
| 36 | 1 | — | 13.99* | 9.29* | 62.6 | 95.6 | 29.3 |
| 37 | 2 | — | 14.03* | 8.87* | 64.3 | 101.6 | 31.6 |

It can be seen from the above results that contact lenses made according to the present invention have good properties for haze, wettability, sessile drop and captive bubble. In addition, the contact lenses can be produced easily and reproducibly using a conventional cast moulding process, such as that described in GB2004/000514. Furthermore, the lenses according to the present invention have good mechanical properties including tensile strength, elongation at break etc. The skilled person is aware of the mechanical properties required by a contact lens.

The invention claimed is:

1. A method of making a contact lens comprising the steps of: mixing:
A) at least 10 weight percent, based on the total composition weight excluding solvent, of at least one silicone-containing monomer of the formula I:

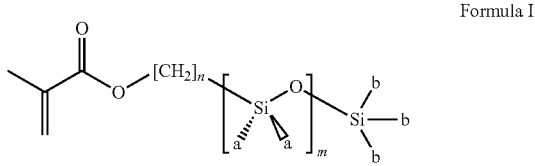

Formula I where n is from 1 to 3, m is from 9 to 15, each a independently is $C_{1-4}$ alkyl, and each b independently is $C_{1-4}$ alkyl;
B) at least 10 weight percent, based on the total composition weight excluding solvent, of 3-methacryloxypropyl tris(trimethylsiloxy)silane;
C) N-vinyl pyrrolidone; and
D) at least one other non-ionic hydrophilic monomer, wherein the combined amount of A) and B) is at least 20 weight percent based on the total composition weight excluding solvent, wherein the N-vinyl pyrrolidone (NVP) is present in such an amount that the reaction product comprises polyvinyl pyrrolidone (PVP) homopolymer; and wherein the reaction mixture is in the absence of pre-polymerized PVP homopolymer; and curing the mixture to form a PVP-containing contact lens.

2. The method of claim 1, wherein the N-vinyl pyrrolidone is present in an amount of from 30 to 60 weight percent.

3. The method of claim 1, wherein the N-vinyl pyrrolidone is present in an amount of from 40 to 60 weight percent.

4. The method of claim 1, wherein D) comprises at least one of 2-hydroxyethyl methacrylate and N,N-dimethylacrylamide.

5. The method of claim 1, additionally comprising up to 3 weight percent based on the total composition weight excluding solvent, of acrylic or methacrylic acid.

6. The method of claim 1, wherein A) comprises trimethylsilyl methacryloxypropyl(polydimethyl siloxane).

7. The method of claim 1, additionally comprising E) a free radical initiator, wherein the free radical initiator is AZBN.

8. The method of claim 1, additionally comprising F) a cross-linker, wherein the cross-linker is tetraethyleneglycol dimethacrylate.

9. The method of claim 1, additionally including a solvent, wherein the solvent comprises at least one primary alcohol.

10. The method of claim 9, wherein the solvent does not contain any secondary or tertiary alcohols.

11. The method of claim 9, wherein the solvent comprises ethanol and/or decanol and/or propanol.

12. The method of claim 9, wherein, the solvent comprises at least one primary alcohol and at least one additional solvent which is more hydrophobic than the primary alcohol, and which is present in an amount of from 20 to 50 weight percent of the solvent.

13. The method as claimed claim 12, wherein the additional solvent is one or more of hexanol, octanol, decanol and ethyl acetate.

14. A method as claimed in claim 13, wherein the solvent comprises a mixture of ethanol and at least one of hexanol, octanol, decanol and ethyl acetate.

15. A method as claimed in claim 1, wherein;
N-vinyl pyrrolidone is present in an amount of from 20 to 60 weight percent, based on the total composition weight excluding solvent;
the at least one non-ionic hydrophilic monomer is present in an amount of from 2 to 10 weight percent, based on the total composition weight excluding solvent; and additionally comprising mixing
E) from 0.2 to 2 weight percent, based on the total composition weight excluding solvent, of a free radical initiator; and
F) from 0.2 to 5 weight percent, based on the total composition weight excluding solvent, of a cross-linking agent, and a solvent in an amount of from 15 to 30 weight percent based on the weight of reactants, wherein the solvent comprises at least one primary alcohol;
adding the mixture into a contact lens mould; and
curing the reaction mixture to form a contact lens.

* * * * *